No. 691,431. Patented Jan. 21, 1902.
F. AMES.
APPARATUS FOR DISPLAYING SAMPLES OF CARPET, &c.
(Application filed Feb. 18, 1901.)
(No Model.) 6 Sheets—Sheet 1.

Fig. 1.

Witnesses:
Wm. Geiger
Lawrence Larsen

Inventor:
Franklin Ames,
By Coburn, McRoberts & McElroy
Attys.

No. 691,431. Patented Jan. 21, 1902.
F. AMES.
APPARATUS FOR DISPLAYING SAMPLES OF CARPET, &c.
(Application filed Feb. 18, 1901.)
(No Model.) 6 Sheets—Sheet 3.

Witnesses:
Wm. Geiger
Lawrence Larsen

Inventor:
Franklin Ames,
By Coburn, McRoberts & McElroy,
Attys.

No. 691,431. Patented Jan. 21, 1902.
F. AMES.
APPARATUS FOR DISPLAYING SAMPLES OF CARPET, &c.
(Application filed Feb. 18, 1901.)
(No Model.) 6 Sheets—Sheet 4.

Witnesses:
Wm. Geiger
Lawrence Larsen

Inventor:
Franklin Ames,
By Coburn, McRoberts & McElroy
Attys.

THE NORRIS PETERS CO., PHOTO-LITHO., WASHINGTON, D. C.

No. 691,431. Patented Jan. 21, 1902.
F. AMES.
APPARATUS FOR DISPLAYING SAMPLES OF CARPET, &c.
(Application filed Feb. 18, 1901.)
(No Model.) 6 Sheets—Sheet 6.

Witnesses:
Wm. Geiger
Lawrence Larsen

Inventor:
Franklin Ames,
By Coburn, McRoberts & McElroy,
Attys.

THE NORRIS PETERS CO., PHOTO-LITHO., WASHINGTON, D. C.

UNITED STATES PATENT OFFICE.

FRANKLIN AMES, OF CHICAGO, ILLINOIS.

APPARATUS FOR DISPLAYING SAMPLES OF CARPET, &c.

SPECIFICATION forming part of Letters Patent No. 691,431, dated January 21, 1902.

Application filed February 18, 1901. Serial No. 47,748. (No model.)

*To all whom it may concern:*

Be it known that I, FRANKLIN AMES, a citizen of the United States, residing at Chicago, in the county of Cook and State of Illinois, have invented a certain new and useful Apparatus for Displaying Samples of Carpet, &c., of which the following is a specification.

My invention relates to a novel apparatus for displaying samples of carpet or other fabrics. As such samples have been hitherto displayed to customers strips—say one and one-half yards in length—are kept piled up and spread out over any available floor-surface when required. After they are inspected and a choice made they are gathered up one by one and stored away until the arrival of another customer necessitates their being spread out again. This method is vexatious and wasteful, as it not only requires the services of the boys to spread out the samples and to gather them up, but it takes up the time of the salesman and the customer while they are being spread out. Another vital objection to this method is the fact that a line of samples may be spread out upon the floor during a quarter to half an hour, during which time they may be walked over and otherwise soiled, so that in a very short time the samples are so dirty that another complete line must be cut off, thus entailing a waste and loss.

In my improved method I hang the samples upon rollers arranged on one or more sides of a room or any suitable space, preferably near the ceiling in a room of ordinary height, and arrange mechanism so that the rollers can be rotated to let down the samples of carpet like a curtain when it is desired to display them and to roll them up where they will be protected from dirt, &c., when not in use. I preferably arrange in connection therewith a series of hooded lights and reflectors, so that the carpet will be brightly illuminated, while leaving the rest of the room less brilliantly lighted.

My present application is concerned with the apparatus by which I carry out my novel method.

Referring now to the accompanying sheets of drawings, in which the same reference characters are used to designate identical parts in all the views.

Figure 1:
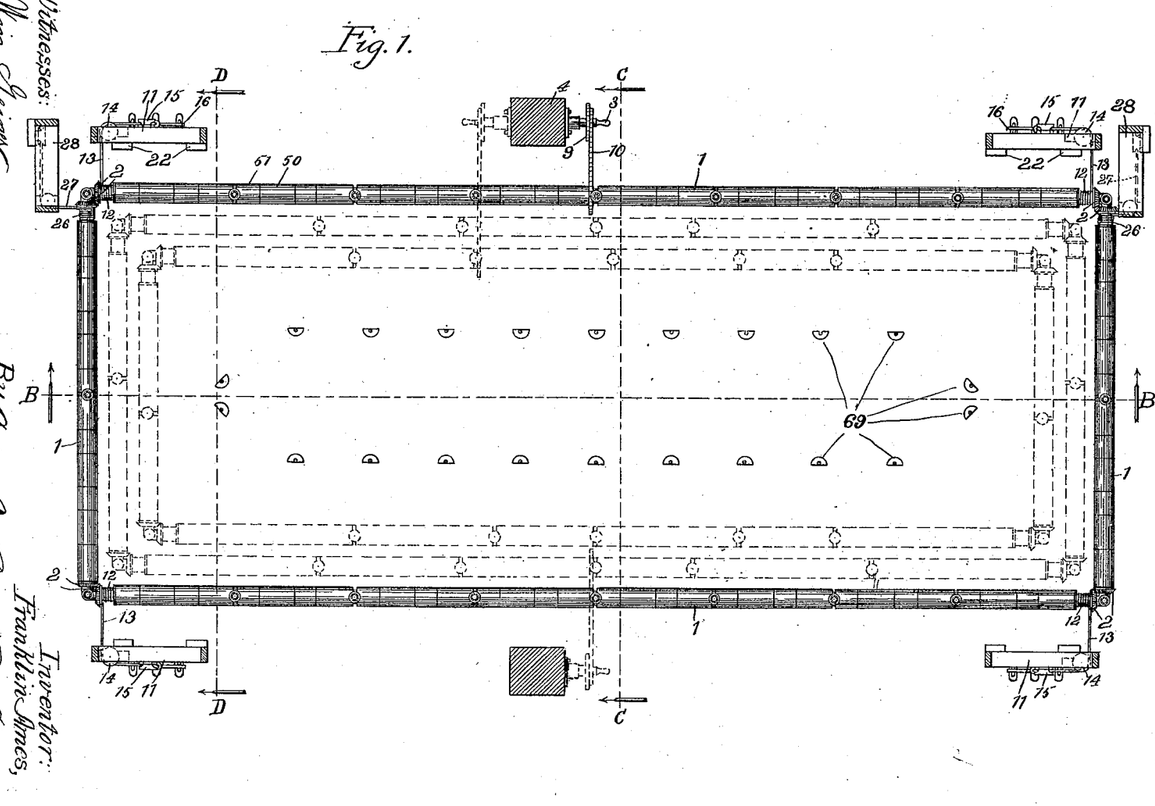
Figure 1 is a plan view, partly diagrammatic, showing the relative arrangement of the rollers, the mechanism by which they are manipulated, the counterweights which may be employed, and the lights in section on the line A A of Fig. 2.
Figure 2:
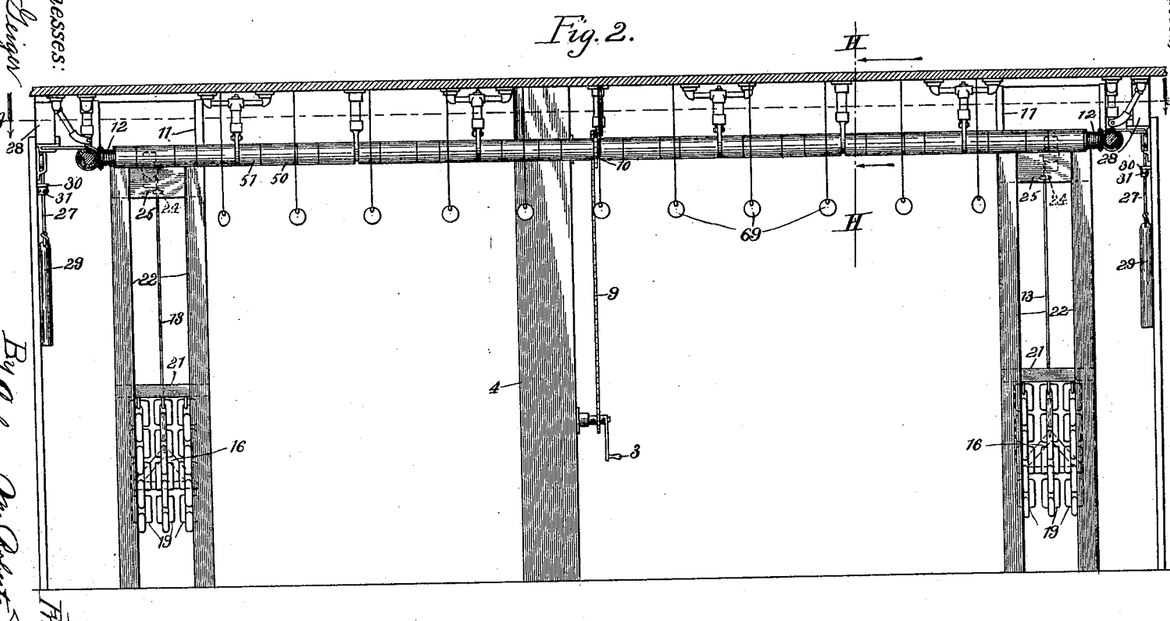
Fig. 2 is an interior side elevation in section on the line B B of Fig. 1.
Figure 3:
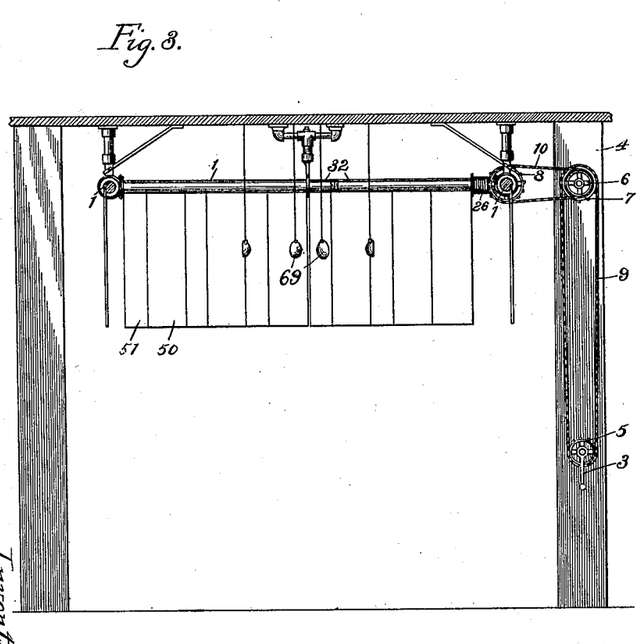
Fig. 3 is an interior end elevation on the line C C of Fig. 1.
Figure 4:
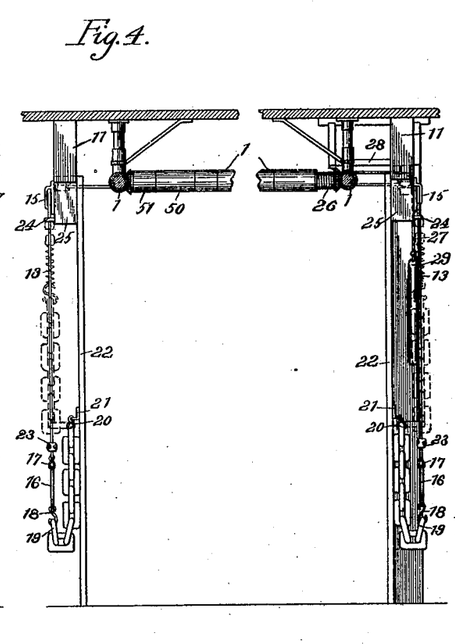
Fig. 4 is a similar view on the line D D of Fig. 1.
Figure 5:
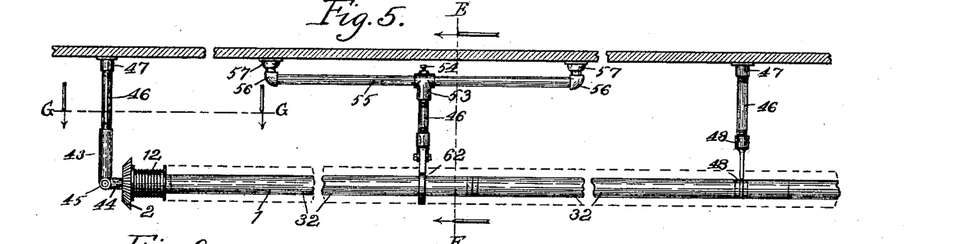
Fig. 5 is an enlarged detail showing the mounting and arrangement of the roller-sections.

As shown in full lines in Fig. 1, I employ rollers 1, preferably arranged on the four sides of a room or space and, if desired, all connected by bevel-gears 2 at the corners, so that they may all be rotated simultaneously to let down or wind up the samples on all four sides at once. To rotate the rollers, as shown in Fig. 3, I preferable employ a crank-handle 3, suitably journaled on some convenient support, as the pillar 4, at a suitable height, and I secure thereon a sprocket-wheel 5. At a point above and preferably directly opposite to the rollers I journal a double sprocket-wheel, consisting of a small wheel 6 and the larger one 7. On the adjacent roller I rigidly secure the sprocket-wheel 8, which is larger than the wheel 7. The wheels 7 and 8 are larger than the wheels 5 and 6, to which they are respectively connected by the sprocket-chains 9 and 10, so that the power required to rotate the rollers will not be so great. Of course it will be understood that any other desired form of speed-reducing and power-transmitting connections might be employed, as my invention is not concerned with the specific mechanism by which the rollers are rotated. In order to counterbalance the weight of the samples, which is considerable, and thus lessen the labor of operating the mechanism, I employ one or more counterbalance mechanisms 11, one of which is preferably located at each corner of the room. This balance mechanism is preferably constructed as follows: Rigidly secured next to and preferably integral with each of the bevel gear-wheels 2 on the side rollers 1, as shown in Fig. 5, is a short helically-grooved winding-drum 12, to which is secured one end of a rope or chain 13, which is wound up on said winding-drum as the rollers 1 are rotating to let down the samples. The ropes or chains 13 pass around the horizontal pulleys 14 and over the vertical pulleys 15, all of which are suitably supported upon brackets secured to walls, pillars, or ceilings, as may be most convenient. The other ends of the ropes 13 are secured to the apexes of the triangles 16 by the hooks 17, and the bases of the triangles 16 are provided with one or more hooks 18, which engage with the ends of sections 19 of heavy chain, the other ends of which are secured by hooks 20 to the cross-piece 21, supported from its posts 22. When the samples are rolled up—for instance, as shown in Fig. 4—their weight is so distributed that it does not tend to cause the roller to rotate in either direction. When the samples are down, as shown in Fig. 3, their weight tends to rotate the roller in one direction and to prevent its being rotated to wind them up. In the position of the chain shown in Fig. 4 very little of its weight is on the rollers, but as its samples are lowered and the rope 13 drawn up the amount of the weight of the chain thrown upon the rollers increases in the same ratio as the effective weight of the samples, so that in all positions the weight of the samples tending to rotate the rolls in one direction is exactly balanced by the weight of so much of the chain as is thrown upon the rollers. This counterbalance mechanism serves to hold the entire apparatus in any position in which it may be placed and also makes the power required to operate it uniform, whether it is being raised or lowered and in all positions, as all the power required is that necessary to overcome the inertia, as the opposing weights are balanced.

To prevent the turning of the rollers any farther than may be necessary to completely let down the samples, I fasten on the rope 13 a stop 23, which, as shown in Fig. 4, is made of two pieces secured together by screws, so that it can be adjusted at any desired point on the rope to limit the amount of the samples that may be displayed. It will be understood, of course, that this stop 23 contacts with an eye secured to the bracket 25, supporting the pulleys 14 and 15, and through which the rope 13 passes as the samples are unwound. It will be apparent that this stop prevents a possibility of the roller being turned so far as to not only unwind and display the samples, but to rewind them in the opposite direction, or possibly permit them to fall off of the hooks to which they are attached. To prevent turning the rollers too far in the other direction, I provide on the end of the rolls the winding-drum 26, to which is secured and upon which is wound a rope 27, which passes over a horizontal pulley and a vertical pulley similar to the pulleys 14 and 15 and supported upon a bracket 28. This rope 27 has attached to its other end a weight 29 and passes through an eye 30, secured on the bracket 28, and has the stop 31 adjustably secured thereon in the same manner as the stop 23. Of course it will be understood that the rope 27 is wound up by the rotation of the rollers in the opposite direction from that which winds up the rope 13, so that as the rope 13 is wound up the rope 27 is unwound, and vice versa. By the employment of this mechanism with adjustable stops it will be seen that I am enabled to arrange the mechanism for any desired length of sample that it may be desired to employ.

Figure 6:
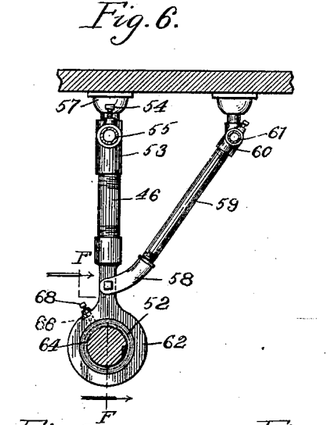
Fig. 6 is a sectional view on the line E E of Fig. 5, but on a larger scale.
Figure 7:
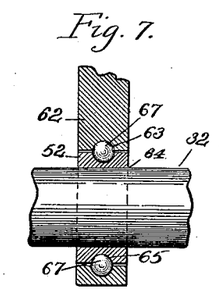
Fig. 7 is a sectional view on the line F F of Fig. 6, but on a still larger scale.
Figure 8:
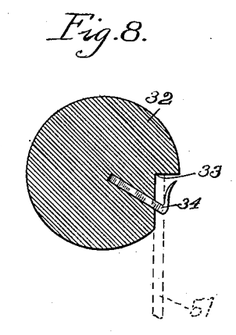
Fig. 8 is a sectional view through one of the rollers, showing how the hooks are arranged.
Figures 9, 10:
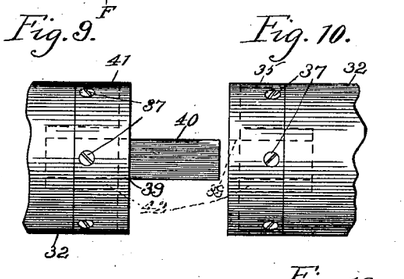
Fig. 9 is a side elevation of one end of a roller-section.
Fig. 10 is a side elevation of the adjacent end of another roller-section.
Figure 11:
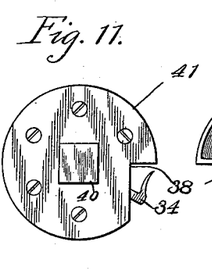
Fig. 11 is an end elevation of the roller shown in Fig. 9.
Figure 12:
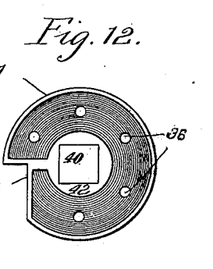
Fig. 12 is an end elevation of the interior of the cap on the roller shown in side elevation in Fig. 11.
Figure 13:
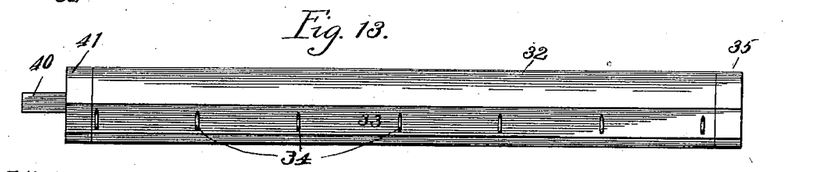
Fig. 13 is a side elevation of a complete roller-section.
Figures 14, 15, 16, 17:
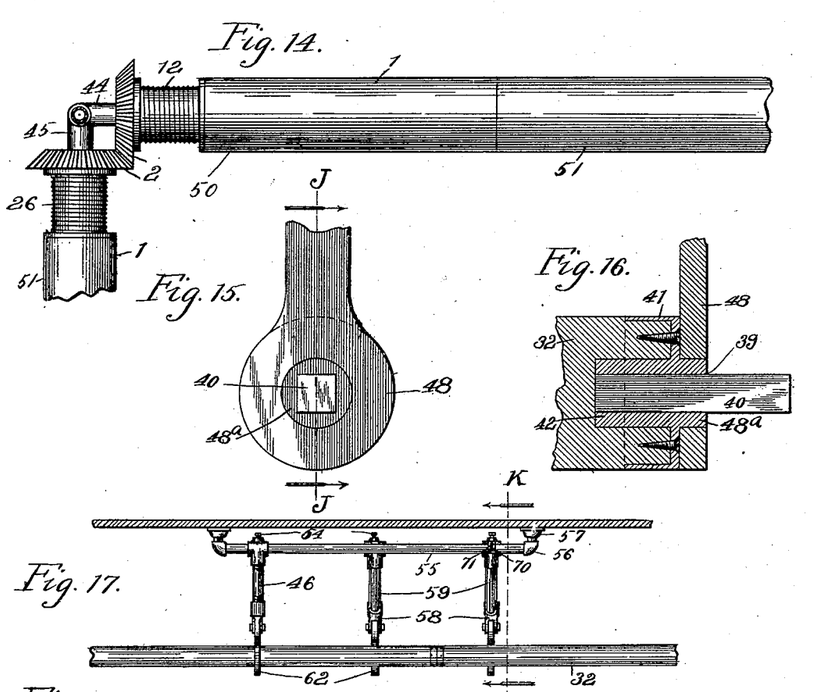
Fig. 14 is an enlarged detail in section on the line G G of Fig. 5.
Fig. 15 is an elevation, on enlarged scale, on substantially the line H H of Fig. 2.
Fig. 16 is a sectional view on the line J J of Fig. 15.
Fig. 17 is a detail in elevation showing the arrangement of the movable supports where two or more parallel sets of rollers are employed.

The rollers 1 are built up of sections 32, one of which is shown in side elevation in Fig. 13. They are preferably constructed of wood and have the groove 33 extending the length thereof. Secured in the body of the roller-sections at suitable intervals in the groove 33, as shown in Fig. 8, are the hooks 34, by which the samples are attached to the rollers. It will be seen that the projecting portions of the hooks are entirely within the circumference of the cylinder, so that as the carpet is rolled up thereon there will be no protuberances formed where it passes over the hooks, and the hooks do not interfere with the movement of the supporting-rings, to be described, along the rollers. One end of the section has secured thereon the cap 35, which is preferably made of metal and may be secured in place by screws passing through the holes 36, as well as by the screws 37 in its periphery. A recess 38 is formed therein, which when the cap is in position forms a continuation of the recess 33 in the body of the section. A preferably square aperture 39 is formed centrally therein, into which passes the projection 40 from the adjacent cap-piece 41, which projection corresponds to the aperture in cross-section and fits snugly therein, so that power applied to one section will rotate the other section and so that there will be no possibility of any angular displacement of one section relative to the other. The two caps 35 and 41 are similar in construction, and the bar or strip constituting the projection 40 is preferably secured in the aperture 39 of the cap 41. Both of them are preferably formed with the central collars 42, which, as shown in dotted lines in Fig. 9, extend some little distance into the body of the section, so that the utmost rigidity of the parts is secured. As will be seen, the rollers 1 are made up of these sections fitted together and having the bevel-gears 2 secured at their ends. They are supported at their ends by a bracket consisting of the vertical tube 43, having at its lower end the arms 44 and 45, projecting therefrom at right angles to each other and to the tube and having formed therein the bearings for the ends of the rollers. The tubes 43 have their upper ends interiorly screw-threaded, and by means of a connecting tube or rod 46, having right and left hand screw-threads upon its ends and coöperating therewith, and the screw-threaded socket 47, secured to the ceiling, the exact height of the roller required may be readily secured, this adjustment being necessary to overcome the possible unevenness in the ceilings to which they are attached. In the long rollers it is necessary to furnish intermediate supports, and I preferably use two kinds of intermediate supports, one stationary and the other adjustable. The stationary support—for example, the one shown at the right-hand end of Fig. 5—consists of the customary socket 47, the right and left hand screw-threaded connection 46, and an annular bearing 48, embracing a collar 48ª, of smaller diameter than the cap 41, to which it is secured or with which it is formed integrally, as shown in Figs. 15 and 16. The annular bearing 48 has the screw-threaded socket 49, into which the connection 46 fits, and the collars 48ª are applied only to the roller-sections adjacent to the stationary supports. It will be observed that these stationary supports can only be applied at the ends of the roller-sections, and in order to prevent any waste of space on the roller, which would necessitate leaving unsightly gaps, it becomes necessary to make some of the supports movable. As will be seen in Fig. 3, the samples usually consist of the body portions 50 and the corresponding borders 51. It may happen that a line of carpet, either of the border or body portion, becomes exhausted, when the sample must be removed, in which case it becomes necessary to rearrange the samples in order to prevent a gap appearing. It may occur, too, that the samples are of different widths. To overcome this difficulty, I employ the adjustable supports, which, as is best shown in Figs. 5 and 6, consist of the customary connecting-piece 46, an annular bearing 52, the construction of which will be explained in detail later, and a T-shaped socket 53, which can be secured by the set-screw 54 in any desired position on the horizontal bearing rod or tube 55, secured above the roller to the ceiling, as by the elbows 56 and the sockets 57, and parallel to the roller. The mechanism herein described provides for a vertical adjustment of the annular bearing 52; but in order to secure the absolute accuracy of the position of the rollers and supports, which is essential to smooth working, I provide means for adjusting the annular bearing 52 horizontally, which means consist of the yoke 58, pivotally connected thereto, as shown, and having the screw-threaded connection 59 and the T-shaped socket 60 adjustable upon the supporting rod or tube 61, which corresponds in structure to the rod 55. The ring 52, as is best shown in Figs. 6 and 7, consists of the outer portion 62, having a groove 63, preferably semicircular in outline, on its interior. Inside of this ring 62 is another ring 64, whose diameter is just sufficient to fit snugly upon the body of the roller, so as to turn with the roller. On its periphery this ring has a groove 65, preferably semicircular, opposite to and corresponding with the groove 63. A channel 66, the position of which is shown in dotted lines in Fig. 6, leads from the exterior of the annulus 62 to the channel formed by the grooves 63 and 65 and is used for the purpose of introducing the antifriction steel balls 67 into the channel and may be closed when not in use by the screw-threaded plug 68. By this construction it will be seen that I have produced a bearing for the roller-sections that runs easily and does not wear the surfaces of the rollers, as all the wear is on the grooves and balls. It will also be apparent that with this construction I can locate the support at any position which may be necessary to accommodate the different widths of the samples to be displayed.

Referring to Fig. 1, 69 represents the shades for lights, which are suspended from the ceiling and serve to throw a bright illumination upon the samples when they are down in the position shown in Fig. 3. By the use of this arrangement of the display apparatus and of the lights I am enabled to produce a very striking effect in the display of the goods, which adds greatly to the ease of taking orders for them, as well as making the display instantaneous and keeping the samples clean and unworn.

If desired, it will be apparent that I may use more than one roller to each side of the room and that I may group them as shown in dotted lines in Fig. 1, in which a series of three sets of rollers are shown arranged one within the other and upon the same horizontal level. In case it is desired to use operating mechanism similar to that shown for the full-line set of rollers the necessary additional operating mechanism may be located in any convenient position and attached to the interior rollers, as indicated in dotted lines in Fig. 1.

Figure 18:
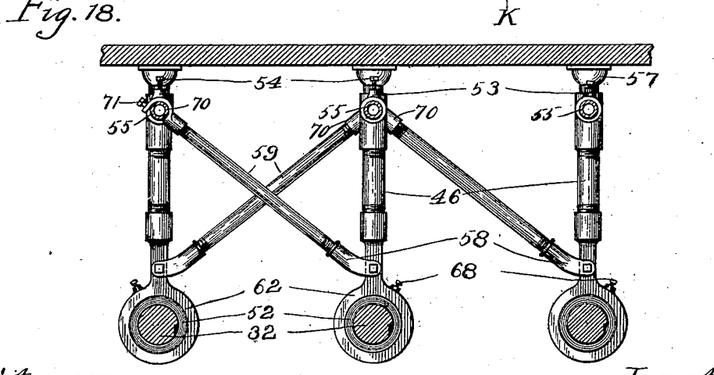
Fig. 18 is a sectional view, on enlarged scale, on the line K K of Fig. 17.

In case two or more sets of parallel rollers are used I preferably modify the construction of the adjustable supports, as shown in Figs. 17 and 18. In such a case I dispense with the auxiliary rod or tube 61 and place the socket 60 or its equivalent upon the rod or tube 55 of the adjacent roller. In this case in order to permit of passing the supports by each other, as may be necessary in arranging the different samples, for the T-shaped socket 60 I substitute a hook 70, which can be lifted off of the rod 55, upon which it is placed. If desired, a set-screw 71 may be passed through the hook 70, so as to prevent any possibility of the hook being accidentally displaced.

Figure 19:
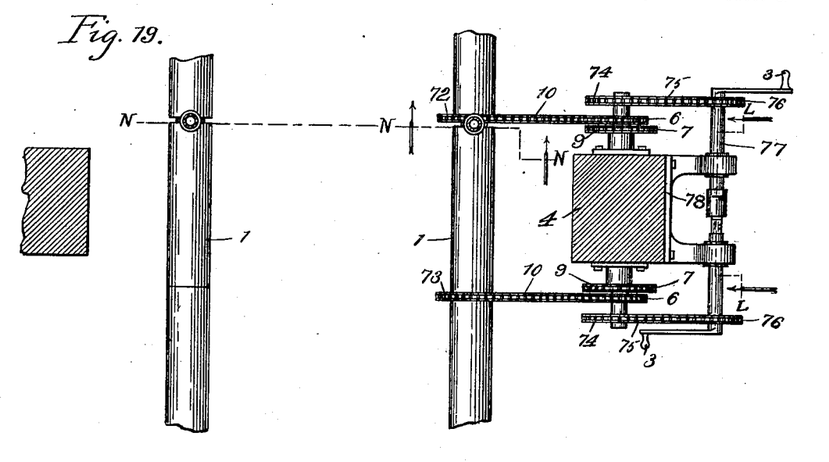
Fig. 19 is a plan view of each side of the central portion of the apparatus, showing a modification.

In some cases I desire to divide a line of samples into two or more groups, which can be operated either together simultaneously or separately at different times, as may be desired. Such a modification of the apparatus is shown in Figs. 19 to 23, where I have shown the samples as divided into two groups, each group constituting all the samples on its side of the center of the room. In Fig. 19 the dividing-line is at N N, and the two halves above and below the line can be operated simultaneously or separately by the actuating mechanism, (shown as mounted upon the pillar 4 in said figure.)

Figure 20:
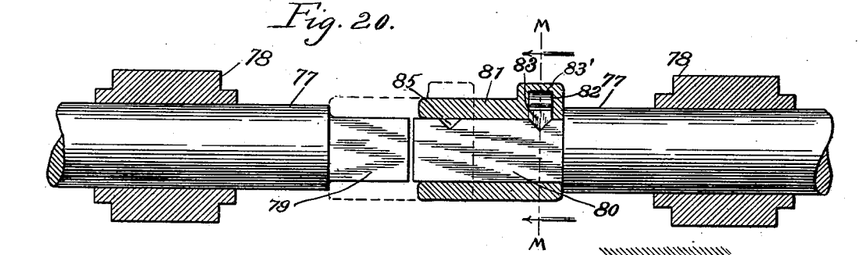
Fig. 20 is an enlarged detail, partly in section, on the line L L of Fig. 19.
Figure 21:
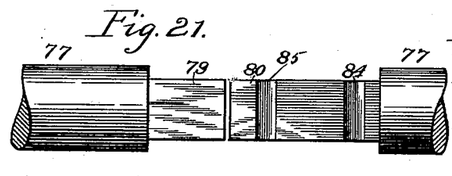
Fig. 21 is a plan view of a portion of the mechanism shown in Fig. 20.
Figure 22:
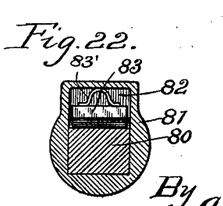
Fig. 22 is a section on the line M M of Fig. 20.
Figure 23:
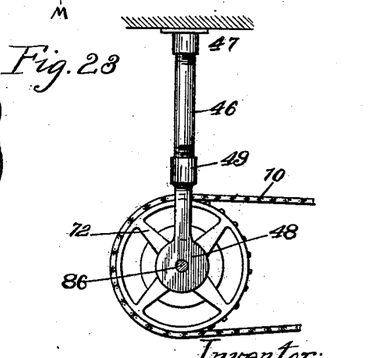
Fig. 23 is an enlarged detail in section on the line N N of Fig. 19.

A sprocket-wheel 72 is connected to one of the rollers 14 in one half, while a sprocket-wheel 73 is connected to the adjacent roller in the other half. Both are connected by sprocket-chains 10 with sprocket-wheels 6, journaled on opposite sides of the pillar 4, and these sprocket-wheels 6 have rigidly secured thereto the larger sprocket-wheels 7, which have the sprocket-chains 9, connecting them with the sprocket-wheels 5, journaled near the bottom of the pillar 4. This speed-reducing and power-transmitting mechanism thus far described is the same as that previously described; but instead of fastening the handles 3 directly to the sprocket-wheels 5 I secure to each of said wheels another larger sprocket-wheel 74, which is connected by a sprocket-chain 75 to a smaller sprocket-wheel 76, secured upon a shaft 77, mounted to rotate in a suitable bearing 78, projecting from the pillar 4 and having the handle 3 secured to the outer end thereof. As seen in Figs. 20 and 21, the adjacent inner ends 79 and 80 of the shafts 77 are squared off to receive a sleeve 81, which has the correspondingly-shaped passage therethrough. The sleeve 81 is intended to stand either in full-line position of Fig. 20, in which case power applied to either handle 3 will operate only its half of the samples, or in the dotted-line position, in which if power is applied to either handle 3 all the samples will be operated. To hold the sleeve yieldingly in either position, I form the pocket 82 in the interior of the sleeve and place in said pocket a plunger 83, pressed by a spring 83', which coöperates with the notch 84 or 85, depending upon which position the sleeve is in. Where the roller-sections forming the ends of the groups are connected, as on the line N N, instead of having the squared projection 40, which compels the adjacent rollers to move together, a round projection 86 is substituted, which permits the two groups to move independently of each other, as desired.

While I have shown my invention as embodied in the apparatus which I at present consider best adapted to carry out its purposes, it will be understood that it is capable of some modifications and that I do not desire to be limited in the interpretation of the following claims except as may be necessitated by the state of the prior art.

What I claim as new, and desire to secure by Letters Patent of the United States, is—

1. In an apparatus for simultaneously displaying a plurality of samples for comparison, the combination with the roller, adapted to have a plurality of samples hung therefrom side by side, of means for rotating said roller to simultaneously display or roll up all of said samples, as may be desired, and counterbalance mechanism attached to said roller to balance the weight of said samples in all stages of the winding thereof, substantially as and for the purpose described.

2. In an apparatus for simultaneously displaying a plurality of samples for comparison, the combination with the roller having the groove therein, means in said groove for detachably securing a plurality of samples side by side to the roller, of means for rotating said roller to simultaneously display or roll up all of said samples, as may be desired, and a counterbalance mechanism at each end of said roller adapted to be raised as the samples are lowered to balance the weight of said samples in all positions of said samples, and vice versa.

3. In an apparatus for simultaneously displaying a plurality of samples for comparison, the combination of a plurality of horizontal rollers journaled in the same plane, each roller being at an angle to the adjacent rollers and adapted to have a plurality of samples hung therefrom side by side, with bevel-gear connections between said adjacent rollers, counterbalance mechanism for said rollers to balance the weight of said samples in all positions thereof, and means for rotating said rollers simultaneously to simultaneously display or roll up all of said samples; substantially as described.

4. In an apparatus for simultaneously displaying a plurality of samples for comparison, the combination of a plurality of horizontal rollers journaled in the same horizontal plane, each roller being at an angle to the adjacent rollers and adapted to have a plurality of samples hung therefrom side by side, with bevel-gear connections between said adjacent rollers, means for rotating said rollers simultaneously to simultaneously display or roll up all of said samples, and a counterweight mechanism consisting of the winding-drum secured adjacent to one of said bevel gear-wheels, a rope wound on said winding-drum, and a variable weight attached to the rope, substantially as described.

5. In an apparatus of the class described, the combination with the roller, of a movable support therefor consisting of the horizontal rod 55, the T-shaped socket 53 adjustable thereon, the annulus embracing the roller and having the socket thereon, and the screw-threaded connecting-piece 46 between said sockets.

6. In an apparatus of the class described, the combination with a roller, of a movable and adjustable support therefor consisting of the horizontal rods 55 and 61 having the T-shaped sockets 53 and 60 adjustable thereon, the ring having a rigid socket thereon and the connecting-piece and another socket pivoted thereto, and the connecting-pieces 46 and 59 coöperating with said sockets and having the right and left hand screw-threads on their ends, substantially as and for the purpose described.

7. In an apparatus of the class described, the combination with a plurality of parallel rollers, of a plurality of horizontal rods 55 suspended above said rollers, and the vertically, longitudinally and laterally adjustable supports, the mechanism for adjusting the supports laterally consisting of the yoke 52 engaging the supports, the hook 70 engaging an adjusting-rod 55 and the adjustable connecting-piece 59 between said yoke and hook, substantially as and for the purpose described.

8. In an apparatus for the purpose described, the combination with the roller adapted to have a plurality of samples hung therefrom, of means for rotating said roller to display or roll up said samples as may be desired, and an adjustable stop mechanism for limiting the extent of rotation given to the roller.

9. In an apparatus for simultaneously displaying a plurality of samples for comparison, the combination with the roller adapted to have a plurality of samples hung therefrom side by side, of means for rotating said roller to simultaneously display or roll up said samples as may be desired, counterbalance mechanism attached to said roller to balance the weight of said samples in all positions thereof, and stop mechanism connected to said counterbalance mechanism for limiting the unwinding movement of the roller.

10. In an apparatus for simultaneously displaying a plurality of samples for comparison, the combination with the roller adapted to have a plurality of samples hung therefrom side by side, of means for rotating said roller to simultaneously display or roll up said samples, as may be desired, counterbalance mechanism attached to said roller to balance the weight of said samples in all positions thereof, and stop mechanism connected to said roller to limit its movement for winding up said samples.

11. In an apparatus for the purpose described, the combination with the roller adapted to have a plurality of samples hung therefrom, of means for rotating said roller to display or roll up said samples, as may be desired, and combined counterbalance and stop mechanism attached to said roller to balance the weight of said samples and limit the movement of said roller in displaying the samples consisting of the winding-drum secured to the roller, the cord adapted to be wound on said drum, and the varying weight attached to the end of the cord, a stop on said cord, and an eye through which said cord passes and with which the stop contacts.

12. In an apparatus for simultaneously displaying a plurality of samples for comparison, the combination with the roller adapted to have samples hung therefrom side by side, of means for rotating said roller to simultaneously display or roll up said samples, as may be desired, and counterbalance mechanism attached to said roller to balance the weight of said samples and consisting of a winding-drum, a cord to be wound on said drum, a chain attached to the other end of the cord and the support for said chain from which it is raised when the roller is rotated to lower the samples.

13. In an apparatus for simultaneously displaying a plurality of samples for comparison, the combination with the roller adapted to have a plurality of samples hung therefrom side by side, of a plurality of supports therefor, the intermediate ones of which can be moved longitudinally of said roller, and means for rotating said roller to simultaneously display or roll up all of said samples as may be desired.

14. In an apparatus for simultaneously displaying a plurality of samples for comparison, the combination with the roller adapted to have a plurality of samples hung therefrom side by side, of a plurality of supports therefor, one or more of the intermediate supports being movable longitudinally of said supports and consisting of the interior ring snugly fitting on said roller, an exterior ring surrounding the interior ring and antifriction-roller devices interposed between said rings, and means for rotating said rollers to simultaneously display or roll up all of said samples as may be desired.

FRANKLIN AMES.

Witnesses:
L. H. SHELLEY,
J. H. McELROY.